United States Patent [19]

Okada et al.

[11] Patent Number: 5,914,370
[45] Date of Patent: *Jun. 22, 1999

[54] MODIFIED SYNDIOTACTIC STYRENIC POLYMER COMPOSITIONS AND BLENDS

[75] Inventors: Akihiko Okada; Akitoshi Masuyama, both of Ichihara, Japan

[73] Assignee: Idemitsu Kosan Co., Ltd., Tokyo, Japan

[ * ] Notice: This patent is subject to a terminal disclaimer.

[21] Appl. No.: 08/966,694

[22] Filed: Nov. 10, 1997

Related U.S. Application Data

[63] Continuation of application No. 08/550,518, Oct. 30, 1995, abandoned, which is a continuation of application No. 08/416,534, Apr. 3, 1995, abandoned, which is a continuation of application No. 08/132,865, Oct. 7, 1993, abandoned.

[30] Foreign Application Priority Data

Oct. 8, 1992 [JP] Japan ................................ 4-269893

[51] Int. Cl.$^6$ .............................. C08L 25/16; C08L 51/00
[52] U.S. Cl. ................................ 525/63; 525/64; 525/66; 525/67; 525/69; 525/71; 524/423; 524/424; 524/494; 524/495; 523/204; 523/214; 523/215
[58] Field of Search ................................ 525/74, 78, 80, 525/285, 71, 207, 208, 63, 64, 66, 67; 524/423, 424, 444, 494, 495; 523/204, 214, 215

[56] References Cited

U.S. PATENT DOCUMENTS

| | | | |
|---|---|---|---|
| 4,780,509 | 10/1988 | Taubitz et al. | 525/285 |
| 5,077,342 | 12/1991 | Grant et al. | 525/285 |
| 5,164,479 | 11/1992 | Funaki et al. | 524/577 |
| 5,200,454 | 4/1993 | Nakano | 524/409 |
| 5,250,629 | 10/1993 | Tani et al. | 125/268 |
| 5,260,394 | 11/1993 | Tazaki et al. | 526/347 |
| 5,326,813 | 7/1994 | Okada et al. | 524/508 |
| 5,352,727 | 10/1994 | Okada | 524/495 |
| 5,543,462 | 8/1996 | Okada et al. | 525/74 |

FOREIGN PATENT DOCUMENTS

| | | |
|---|---|---|
| 0 384 208 | 8/1990 | European Pat. Off. . |
| 0 422 495 | 4/1991 | European Pat. Off. . |
| 0 508 303 | 10/1992 | European Pat. Off. . |

OTHER PUBLICATIONS

CA118(16): 148738X Abstract for EP 508303 A1.
Database WPI, Derwent Publications Ltd., AN 89–273432, JP–A–1 197 547, Aug., 1989.

*Primary Examiner*—Mark L. Warzel
*Attorney, Agent, or Firm*—Oblon, Spivak, McClelland, Maier & Neustadt, P.C.

[57] ABSTRACT

There are disclosed a thermoplastic resin composition which comprises a styrenic resin comprising a modified styrenic polymer in which a compound having an unsaturated group and a polar group is bonded to the skeleton of a styrenic polymer having syndiotactic configuration (SPS) or to an end or an intermediate position of a substituent of the SPS, or the mixture of the above modified styrenic polymer and an unmodified SPS; and an inorganic filler, as well as a thermoplastic resin composition which comprises the aforesaid styrenic resin; and an other thermoplastic resin. The compositions are excellent in water resistance, impact resistance, heat resistance, modulus of elasticity and dynamical properties and capable of improving the adhesiveness to the inorganic filler or compatibility with the other resin without impairing the crystallization of the SPS and deteriorating the long-term heat resistant stability of the compositions.

16 Claims, No Drawings

MODIFIED SYNDIOTACTIC STYRENIC POLYMER COMPOSITIONS AND BLENDS

This application is a Continuation of application Ser. No. 08/550,518, filed on Oct. 30, 1995, now abandoned, which is a Continuation of application Ser. No. 08/416,534, filed on Apr. 3, 1995, now abandoned, which is a Continuation of application Ser. No. 08/132,865, filed on Oct. 7, 1993, now abandoned.

BACKGROUND OF THE INVENTION

1. Field of the Invention

The present invention relates to a thermoplastic resin composition. More particularly, it pertains to a thermoplastic resin composition well suited for the formation of industrial materials such as electric and electronic materials, industrial construction material, automobile parts and domestic electrical appliances.

2. Description of the Related Arts

Various thermoplastic resins have heretofore been improved in heat resistance, dynamical properties, dimensional stability and hygroscopicity by compounding therein an inorganic filler or an different resin. In the field of engineering plastics, investigation for such improvement and practical application have been made on polyester, polyamide, polycarbonate and the like. Further improvement, however, is desired with increasing demand for heat resistance and water resistance in recent years. On the other hand, a styrenic polymer having syndiotactic configuration has recently been developed and attracted special interest as an engineering plastics provided with heat resistance and water resistance. Nevertheless, the above-developed styrenic polymer having syndiotactic configuration is still insufficient in rigidity and impact strength, and further improvement in heat resistance is eagerly desired.

For the purpose of further improving the dynamical properties and heat resistance of the styrenic polymer having syndiotactic configuration (hereinafter sometimes referred to as "syndiotactic polystyrene"), the group of the present inventors has already proposed a method by blending an inorganic filler (Japanese Patent Application Laid-Open No. 257948/1987) and a method for improving adhesion to an inorganic filler (Japanese Patent Application Laid-Open Nos. 258855/1990 and 126743/1991). The methods have exhibited prominent effect on the improvement as compared with conventional techniques, but have still been imperfect in the effect, leaving some room for further improvement.

Particularly in the latter proposal, there have been used atactic polystyrene and a polymer having a polyphenylene ether in its skeleton that are compatible with the syndiotactic polystyrene in order to improve the adhesiveness between the syndiotactic polystyrene and an inorganic filler. However, the aforesaid polymers have been poor in heat resistance as compared with the syndiotactic polystyrene, sometimes causing the possibility of inhigiting crystallization. The syndiotactic polystyrene compounded with the polymer having a polyphenylene ether skeleton has suffered the disadvantage that the long-term heat resistant stability of the syndiotactic polystyrene composition has been deteriorated to a great extent.

In addition, the group of the present inventors investigated a polymer alloy of the syndiotactic polystyrene and an other resin (polyamide, PET or PBT) and tried to improve the syndiotactic polystyrene composition in impact resistance and elongation thereof as well as the other resin in hygroscopicity, dimensional stability, heat resistance and rigidity. As a result, there has been a limit in the improvement effect because of the inevitable deterioration of the dynamical properties arising from the insufficiency of the particle size dispersion and interfacial strength, since the composition consists of the resins that are inherently incompatible with each other. Such being the case, there was proposed by the aforesaid group a method wherein atactic polystyrene and a polymer having a polyphenylene ether in its skelton were used as compatibilizers (Japanese Patent Application Laid-Open No. 126744/1991). After all the above-mentioned problem still remains unsolved in the use of the compatibilizers as proposed above.

Under such circumstances, intensive research and investigation were continued by the present inventors in order to develop an adhesive, a compatibilizer and a syndiotactic polystyrene composition using the same each being excellent in water resistance, impact resistance, heat resistance, modulus of elasticity and dynamical properties and capable of improving the adhesiveness to an inorganic filler and compatibility with other resins without impairing the crystallization of the syndiotactic polystyrene and deteriorating the long-term heat resistant stability of the same.

SUMMARY OF THE INVENTION

As a result, it has been found by the present inventors that the aforesaid problems can be solved by using a modified styrenic-polymer as the styrenic polymer and blending therein an inorganic filler or an other resin each in a prescribed proportion. The present invention has been accomplished on the basis of the above-mentioned finding and information.

Specifically, the present invention provides a thermoplastic resin composition which comprises as principal components 100 parts by weight of (A) a styrenic resin comprising (a) a modified styrenic-polymer in which a styrenic polymer having syndiotactic configuration is combined with a compound having at least one unsaturated group and at least one polar group or (b) the mixture of said modified styrenic polymer and a styrenic polymer having syndiotactic configuration; and 1 to 350 parts by weight of (B) an inorganic filler, and at the same time, a thermoplastic resin composition which comprises as principal components 5 to 95% by weight of (A) a styrenic resin comprising (a) a modified styrenic polymer in which a styrenic polymer having syndiotactic configuration is combined with a compound having at least one unsaturated group and at least one polar group or (b) the mixture of said modified styrenic polymer and a styrenic polymer having syndiotactic configuration; and 95 to 5% by weight of (c) a thermoplastic resin other than said styrenic resin (A).

DESCRIPTION OF PREFERRED EMBODIMENT

The styrenic resin as the component (A) in the present invention signifies (a) a modified styrenic polymer in which a styrenic polymer having syndiotactic configuration is combined with a compound having an unsaturated group and a polar group or (b) the mixture of said modified styrenic polymer and a styrenic polymer having syndiotactic configuration.

In the component (A), the styrenic polymer having syndiotactic configuration is used as the starting raw material for a modified styrenic polymer and for mixing with the modified styrenic polymer. Here, the syndiotactic configuration in the styrenic polymer having syndiotactic configuration means that its stereochemical structure is of syndiotactic configuration, that is, the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrenic polymers having such syndiotactic configuration as mentioned in the present invention usually means polystyrene, poly(alkylstyrene), poly(halogenated styrene), poly(halogenated alkylstyrene), poly(alkoxystyrene), poly(vinyl benzoate), hydrogenated polymer thereof, the mixture thereof, and copolymers containing the above polymers as main components, having such a syndiotacticity as determined by the above-mentioned method that the proportion of racemic diad is at least 75%, preferably at least 85%, or the proportion of racemic pentad is at least 30%, preferably at least 50%. The poly(alkylstyrene) includes poly(methylstyrene), poly(ethylstyrene), poly(isopropylstyrene), poly(tert-butylstyrene), poly(phenylstyrene), poly(vinylnaphthalene) and poly(vinylstyrene). Poly(halogenated styrene) includes poly(chlorostyrene), poly(bromostyrene), and poly(fluorostyrene). Poly(halogenated alkylstyrene) includes poly(chloromethylstyrene). Poly(alkoxystyrene) includes poly(methoxystyrene), and poly(ethoxystyrene).

The particularly desirable styrenic polymers are polystyrene, poly(p-methylstyrene), poly(m-methylstyrene), poly(p-tert-butylstyrene), poly(p-chlorostyrene), poly(m-chlorostyrene), poly(p-fluorostyrene), hydrogenated polystyrene and the copolymer containing the structural units thereof.

The molecular weight of the styrenic polymer to be used in the present invention is not specifically limited, but is desirably 10,000 or more, more desirably 50,000 or more in terms of weight-average molecular weight. The molecular-weight distribution, that is, the broadening of molecular weight of the styrenic polymer is not specifically limited as well, but may be in a wide range. A weight-average molecular weight of less than 10,000 is unfavorable since the composition or molding obtained is deteriorated thereby in the thermal and mechanical properties.

The styrenic polymer having such syndiotactic configuration can be produced by polymerizing a styrenic monomer which corresponds to the above styrenic polymer in the presence or absence of a solvent such as an inert hydrocarbon by the use of a catalyst comprising a titanium compound and a condensation product of water and trialkylaluminum (Japanese Patent Application Laid-Open No. 187708/1987). In addition, the poly(halogenated alkylstyrene) and the hydrogenated product thereof can be produced by the processes described in Japanese Patent Application Laid-Open Nos. 46912/1989 and 178505/1989, respectively.

The styrenic polymer having syndiotactic configuration to be used as the starting raw material for the production of the modified styrenic polymer is not specifically limited except for a nonsubstituted styrenic polymer without a substituent on phenyl group, but is preferably a copolymer of styrene and a substituted styrene from the viewpoint of compatibility with an unmodified styrenic polymer having syndiotactic configuration to be blended therewith. The compositional ratio in the copolymer is not limited, but is preferably 1 to 50 mol % for the substituted styrene. A ratio of the substituted styrene less than 1 mol % sometimes causes difficulty in modification, whereas that more than 50 mol % sometimes leads to unfavorable decrease in compatibility with an unmodified styrenic polymer having syndiotactic configuration to be blended with the copolymer. Examples of the particularly desirable substituted styrene as the comonomer for the aforesaid copolymer include alkylstyrene such as methylstyrene, ethylstyrene, isopropylstyrene, tert-butylstyrene and vinylstyrene; halogenated styrene such as chlorostyrene, bromostyrene and fluorostyrene; halogenated alkylstyrene such as chloromethylstyrene; and alkoxystyrene such as methoxystyrene and ethoxystyrene.

In the case where the mixture of the modified styrenic polymer and the styrenic polymer having syndiotactic configuration is employed as the component (A) and where the content of the latter polymer is not more than 10% by weight, there may be used said polymer containing a styrenic polymer having atactic configuration. A content thereof more than 10% by weight unfavorably deteriorates the heat resistance of the composition to be produced.

The above-mentioned compound to be used as the modifying agent having an unsaturated group and a polar group is a compound having in the same molecule, an unsaturated group such as carbon-carbon double bond and carbon-carbon triple bond, and a polar group such as carboxyl group, a group derived from a carboxylic acid exemplified by various salts and esters formed by replacement of hydrogen atom or hydroxyl group of carboxyl group, acid amide; acid anhydride, imide, acid azide, halogenated acid, oxazoline, nitrile, epoxy group, amino group, hydroxyl group and isocyanic acid ester.

Major examples of the compound having a polar group and an unsaturated group include unsaturated carboxylic acid, derivatives thereof, unsaturated epoxy compounds, unsaturated alcohol, unsaturated amine and unsaturated isocyanic acid esters, specifically exemplified by maleic anhydride, maleic acid, fumaric acid, maleimide, N-substituted product thereof, maleic acid ester, maleic hydrazide and a reaction product of maleic acid and diamine represented by, for example, the constitutional formula

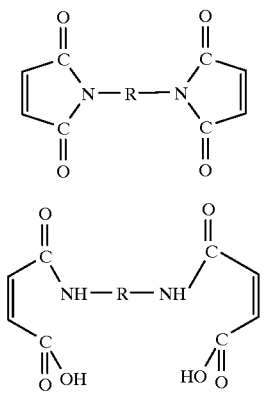

wherein R is an aliphatic or aromatic group, organic acid, anhydride thereof and acid amide such as methylnadic anhydride, dichloromaleic anhydride; maleic amide; itaconic acid; and itaconic anhydride, natural fat and oil such as soybean oil; tung oil; castor oil; linseed oil; hempseed oil; cotton seed oil; sesame oil; rapeseed oil; peanut oil; camellia oil; olive oil; coconut oil; and sardine oil, unsaturated carboxylic acid such as acrylic acid; butenoic acid; crotonic acid; vinylacetic acid; methacrylic acid; pentenoic acid; angelic acid; thebenolic acid; 2-pentenoic acid; 3-pentenoic acid; α-ethylacrylic acid; β-methylcrotonic acid; 4-pentenoic acid; 2-hexenoic acid; 2-methyl-2-pentenoic acid; 3-methyl-2-pentenoic acid; α-ethylcrotonic acid; 2,2-dimethyl-3-butenoic acid; 2-heptenoic acid; 2-octenoic acid; 4-decenoic acid; 9-undecenoic acid; 10-undecenoic acid; 4-dodecenoic acid; 5-dodecenoic acid; 4-tetradecenoic acid; 9-tetradecenoc acid; 9-hexadecenoic acid; 2-octadecenoic acid; 9-octadecenoic acid; eicosenoic acid; docosenoic acid; erucic acid; tetracosenoic acid; myelibainic acid; 2,4-pentadienoic acid; 2,4-hexadienoic acid; diallylacetic acid; geranic acid; 2,4-decadienoic acid; 2,4-dodecadienoic acid; 9,12-hexadecadienoic acid; 9,12-octadecadienoic acid; hexadecatriolefinic acid; linolic acid; linolenic acid; octadecatriolefinic acid; eicosadienoic acid; eicosatriolefinic acid; eicosatetraolefinic acid; ricinolic acid; eleostearic acid; oleic acid; eicosapentaenoic acid; erucinoic acid; docosadienoic acid; docosatriolefinic acid; docosatetraolefinic acid; docosapentaenoic acid; tetracosenoic acid; hexacosenoic acid; hexacodienoic acid; octacosenoic acid; and tetracosenoic acid, and esters thereof, acid amide thereof, anhydride thereof, unsaturated alcohol such as allyl alcohol; crotyl alcohol; methylvinyl carbinol; allyl carbinol; methylpropenyl carbinol; 4-pentene-1-ol; 10-undecane-1-ol; propargyl alcohol; 1,4-pentadiene-3-ol; 1,4-hexadiene-3-ol; 3,5-hexadiene-2-ol; 2,4-hyexadiene-1-ol; hydroxyethyl methacrylate; alcohol represented by the general formula $C_nH_{2n-5}$OH, $C_nH_{2n-7}$OH or $c_nH_{2n-9}$OH wherein n denotes a positive integer; 3-butene-1,2-diol; 2,5-dimethyl-3-hexene-2,5-diol; 1,5-hexadiene-3,4-diol; and 2,6-octadiene-4,5-diol, unsaturated amine derived from unsaturated alcohol by substituting $NH_2$ group for OH group, adduct of low polymer, e,g. with an average molecular weight of 500 to 1000, approx, or adduct of high polymer, e,g. with an average molecular weight of 10,000 or more derived from butadiene, isoprene, etc. with maleic anhydride, phenols or the like; above adduct into which amino group; carboxyl group; hydroxyl group, epoxy group or the like is introduced; and allyl isocyanate.

Examples of vinyl compound having an epoxy group include glycidyl methacrylate; glycidyl acrylate; vinylglycidyl ether; glycidyl ether of hydroxyalkyl (meth)acrylate; glycidyl ether of polyalkyleneglycol (meth)acrylate and glycidyl itaconate.

Among the above-exemplified compound, maleic anhydride and glycidyl methacrylate are particularly desirable.

Needless to say, examples of the modifying agent include a compound having same or different and at least two unsaturated groups and/or polar groups, and it is possible to use at least two such compounds.

The modified styrenic polymer as the component (A) of the present invention can be obtained by bonding the aforesaid modifying agent to the styrenic polymer having syndiotactic configuration. Various processes are available for the production of the modified styrenic polymer including, for example, a process wherein a styrenic polymer and the modifying agent are melt kneaded at 150 to 350° C. to proceed with reaction by the use of a roll mill, Banbury mixer, extruder or the like, and a process in which the aforesaid components are reacted with heating in a solvent such as benzene, toluene, xylene or the like. In order to readily proceed with the reaction, it is effective to allow a radical generating agent to be present in the reaction system which is exemplified by benzoyl peroxide, di-tert-butyl peroxide, dicumyl peroxide, tert-butyl peroxybenzoate, azobis(isobutyronitrile), azobis(isovaleronitrile) and 2,3-diphenyl-2,3-dimethylbutane. As the preferable process, mention may be made of a process by melt kneading in the presence of a radical generating agent.

The modified styrenic polymer thus produced is regarded as the polymer in which the modifying agent is introduced into the structure of the styrenic polymer to be used as the starting material at unspecific positions, for example, in the skeleton of the styrenic polymer, or at the end or an intermediate position of the substituent.

The modified styrenic polymer as described hereinbefore can be employed not only as an adhesive between the syndiotactic polystyrene and the inorganic filler or a compatibilizer between the styrenic resin and an other resin but also as the syndiotactic polystyrene as such which is enhanced in adhesiveness to the inorganic filler or in compatibility with the other resin. Accordingly, as the modified styrenic polymer which is the component (A) of the present invention, there may be employed, of course, a mixture of at least one modified styrenic polymer and at least one unmodified syndiotactic polystyrene; and besides at least one modified styrenic polymer not containing an unmodified syndiotactic polystyrene. The component (A) is not specifically limited provided that the modified styrenic polymer is contained therein. The compounding ratio of the modified styrenic polymer to the unmodified syndiotactic polystyrene may be optionally selected, but is desirably 1% or more by weight, more desirably 3% or more by weight. A compounding ratio thereof less than 1% results in insufficient effect from the introduction of the polar group.

As the inorganic filler which is the component (B) of the present invention, there is preferably employed the inorganic filler which is surface-treated with a coupling agent to enhance adhesivity between the filler and the styrenic resin as the component (A).

There are available a wide diversity of inorganic fillers in the form of fiber, granule, powder or the like. Examples of fibrous filler include glass fiber, carbon fiber, whisker, ceramics fiber and metallic fiber, more specifically, boron; alumina; silica; and silicon carbide as whisker, gypsum; potassium titanate; magnesium sulfate; and magnesium oxide as ceramics fiber, copper; aluminum; and steel as metallic fiber. The form or shape of the filler includes cloth, mat, bound and cut fiber, short fiber, filament and whisker. The bound and cut fiber has preferably a length of 0.05 to 50 mm and a diameter of 5 to 20 $\mu$m. The cloth or mat has a length of 1 mm or more, preferably 5 mm or more.

Examples of granular or powdery filler include talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, metallic powder, glass powder, glass flake and glass bead. Among the above-exemplified fillers are particularly desirable glass filler such as glass filament, glass fiber, glass roving, glass mat, glass powder, glass flake and glass beads.

The coupling agent may be suitably selected for use from the publicly known silane-based coupling agent and titanium-based coupling agent. Examples of the silane-based coupling agent include triethoxysilane, vinyltris(β-methoxyethoxy)silane, γ-methacryloxypropyltrimethoxysilane, γ-glycidoxypropyltrimethoxysilane, β-(1,1-epoxycyclohexyl)ethyltrimethoxysilane, n-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, γ-chloropropyltrimethoxysilane, γ-aminopropyltrimethoxysilane, γ-aminopropyl-tris(2- methoxy-ethoxy)silane, N-methyl-γ-aminopropyltrimethoxysilane, N-vinylbenzyl-γ-aminopropyltriethoxysilane, triaminopropyltrimethoxysilane, 3-ureidopropyltrimethoxysilane, 3-4,5-dihydroimidazolepropyltriethoxysilane, hexamethyldisilazane, N,O-(bistrimethylsilyl)amide and N,N-bis(trimethylsilyl)urea. Among them are desirable aminosilane and epoxysilane such as γ-aminopropyltriethoxysilane, N-β-(aminoethyl)-γ-aminopropyltriethoxysilane, γ-glycidoxypropyltrimethoxysilane, β-(3,4-epoxycyclohexyl)ethyltrimethoxysilane.

Specific examples of the titanium-based coupling agent include isopropyltriisostearoyl titanate, isopropyltridodecylbenzenesulfonyl titanate, isopropyltris(dioctylpyrophosphate) titanate, tetraisopropylbis(dioctylphosphite) titanate, tetraoctylbis(di-tridecylphosphite) titanate, tetrta(1,1-diallyloxymethyl-1-butyl)bis(di-tridecyl)phosphite titanate, bis(dioctylpyrophosphate)oxyacetate titanate, bis(dioctylpyrophosphate)ethylene titanate, isopropyltrioctanoyl titanate, isopropyldimethacrylisostearoyl titanate, isopropylisostearoyldiacrylate titanate, isopropyltri(dioctylphosphate) titanate, isopropyltricumylphenyl titanate, isopropyltri(N-amidoethyl-aminoethyl) titanate, dicumylphenyloxyacetate titanate and di-isostearoylethylene titanate, among which isopropyltri(N-amidoethylaminoethyl) titanate is desirable.

The surface treatment of the above-mentioned filler by the use of such coupling agent can be effected by a conventional known method without specific limitation, for example, sizing treatment in which the filler is coated with the sizing agent in the form of solution of the coupling agent as mentioned above in an organic solvent or in the form of suspension containing the coupling agent; dry blending by the use of a Henschel mixer, super mixer, Ready-gel mixer, V-type blender or the like; spraying method; integral blending; dry concentration or the like, each being suitably selected according to the form and shape of the filler to be used. The surface treatment is, however, preferably carried out by means of sizing treatment, dry blending, spraying or the like.

In combination with the aforementioned coupling agent, a film forming substance for glass may be used without specific limitation and is exemplified by the polymer such as polyester-based, urethane-based, acrylic and vinyl acetate-based polymers.

The amount of the surface-treated inorganic filler to be used as the component (B) of the present invention is 1 to 350, preferably 5 to 200, more preferably 10 to 100 parts by weight per 100 parts by weight of the foregoing component (A). An amount of the filler less than 1 part by weight results in insufficient effect on heat resistance, rigidity, impact resistance and the like, whereas that exceeding 350 parts by weight leads to the disadvantage of poor dispersion and difficulty in molding.

In addition to the aforestated inorganic filler, an organic filler may be added to the composition of the present invention and is exemplified by organic synthetic fiber, natural vegetable fiber etc., more specifically by totally aromatic polyamide fiber, polyimide fiber and the like.

In the production of the thermoplastic resin composition comprising the components (A) and (B) as the principal components according to the present invention, the compounding of the above-described components may be carried out by various known methods including (1) melt kneading, (2) a method wherein a sheet formed from the component (A) or a composition thereof and a glass mat are laminated followed by melting, (3) a method wherein the component (A) or a composition thereof and an inorganic filler in the form of long fiber are mixed in a liquid to form a slurry, and after settling, are heated.

The thermoplastic resin blendable as the component (C) of the present invention is not specifically limited, but is exemplified by polyolefin such as polyphenylene ether; polyethylene; polypropylene; polybutene; and polypentene, polyester such as polyethylene terephthalate; polybutylene terephthalate; and polyethylene naphthalate, polythioether such as polyamide; polyphenylene sulfide, polycarbonate; polyarylate; polysulfone; polyether ether ketone; polyether sulfone; polyimide; polyamidimide; poly(methyl methacrylate); ethylene/acrylic acid copolymer; acrylonitrile/styrene copolymer; acrylonitrile/chlorinated polyethylene/styrene copolymer; ethylene/vinyl acetate copolymer; ethylene/vinyl alcohol copolymer; vinyl chloride resin; chlorinated polyethylene; fluorinated polyethylene; polyacetal; thermoplastic urethane elastomer; 1,2-polybutadiene; styrene/maleic anhydride copolymer; and modified products therefrom. Examples of preferable thermoplastic resin include those having affinity or reactivity with the polar group of the modified styrenic polymer exemplified by modified polyolefin; olefin/polar vinyl monomer copolymer; polyamide; polycarbonate; polyarylate; polyethylene terephthalate; polybutylene terephthalate; and modified polyphenylene sulfide. The above-mentioned thermoplastic resin may be used alone or in combination with at least one of them.

In the production of the thermoplastic resin composition comprising the components (A) and (C) as the principal components according to the present invention, the compounding proportion of the component (A) is 5 to 95%, desirably 10 to 90%, more desirably 20 to 80% by weight based on the total amount of the composition, that is, the compounding proportion of the component (C) is 95 to 5%, desirably 90 to 10%, more desirably 80 to 20% by weight based thereon. A proportion of the component (C) less than 5% or more than 95% by weight results in insufficient improvement in impact resistance, elongation, dimensional stability and rigidity.

In the production of the composition comprising the components (A) and (C), the compounding of the aforesaid components may be carried out by various known methods including (1) melt kneading and (2) solution blending.

The resin composition according to the present invention may be blended with a rubbery elastomer for the purpose of improving impact resistance in addition to the aforestated components (A), (B) and (C). A variety of rubbery elastomers are available and exemplified by, as preferable ones, those containing a styrenic compound as one of the components such as styrene/butadiene black copolymer rubber (SBR), styrene/butadiene/styrene block copolymer (SBS), hydrogenated styrene/butadiene/styrene block copolymer (SEBS), styrene/isoprene block copolymer (SIR), styrene/isoprene/styrene block copolymer (SIS), hydrogenated styrene/isoprene/styrene block copolymer (SEPS), ethylene/propylene rubber (EPM), ethylene/propylene/diene rubber (EPDM), ethylene/butylene rubber (EBM) and modified rubber therefrom. Among these, SEBS, SBR, SBS, SIS, SIR and SEPS are particularly desirable.

Usable rubbery-elastomers other than the above include natural rubber, polybutadiene, polyisoprene, polyisobutylene, neoprene, ethylene/propylene copolymer rubber, polysulfide rubber, thiokol rubber, acrylic rubber, urethane rubber, silicone rubber, epichlorohydrin rubber, and modified rubbers therefrom.

The compounding proportion of the aforestated rubbery elastomer is not specifically limited, but is desirably 5 to 100, more desirably 10 to 80 parts by weight based on 100 parts by weight of the component (A). A proportion thereof less than 5 parts by weight results in insufficient improvement effect on impact resistance, whereas that more than 100 parts by weight may cause deterioration of heat resistance and rigidity.

The resin composition of the present invention may be incorporated with an additive such as antioxidant, ultraviolet ray absorber, external lubricant, nucleating agent, antistatic agent, colorant, flame retardant, flame retarding aid or the like or an thermoplastic resin other than the above as necessary insofar as the object of the present invention is not impaired.

In summary, the thermoplastic resin composition according to the present invention is excellent in water resistance, impact resistance, heat resistance and dynamical properties, and is expected to find a variety of effective applications including the formation of industrial materials such as electric and electronic materials, industrial construction material, automobile parts, domestic electrical appliances and various mechanical parts.

In the following, the present invention will be described in more detail with reference to non-limitative examples and comparative examples.

PREPARATION EXAMPLE 1

One (1) kg of styrene/p-methylstyrene copolymer having syndiotactic configuration (p-methylstyrene content of 12 mol %) and 30 g of maleic anhydride were dry-blended and melt kneaded by the use of a 30 mm twin-screw extruder at a revolution of 200 rpm at a temperature set to 300° C.

The resultant strand was cooled and then pelletized to produce maleic anhydride-modified styrenic polymer.

In order to measure the modification rate, 1 g of the resultant modified styrenic polymer was dissolved in ethylbenzene and thereafter reprecipitated in methanol, and the recovered polymer was subjected to Soxhlet extraction using methanol and dried. The modification rate was determined from the intensity of carbonyl absorption in infrared (IR) absorption spectrum and by neutralizing titration. The result is given in Table 1.

PREPARATION EXAMPLE 2

One (1) kg of styrene/p-methylstyrene copolymer having syndiotactic configuration (p-methylstyrene content of 12 mol %), 30 g of maleic anhydride and 10 g of 2,3-dimethyl-2,3-diphenylbutane (NOPHMER BC, produced by Nippon Oil & Fat Co. Ltd.) as the radical generating agent were dry-blended and melt kneaded by the use of a 30 mm twin-screw extruder at a revolution of 200 rpm at a temperature set to 300° C., while the resin temperature was about 330° C. The resultant strand was cooled and then pelletized to produce maleic anhydride-modified styrenic polymer.

In order to measure the modification rate, the procedure in Example 1 was repeated. The result is given in Table 1.

PREPARATION EXAMPLE 3

The procedure in Preparation Example 2 was repeated to determine the modification rate except that styrene/p-methylstyrene copolymer having syndiotactic configuration and p-methylstyrene content of 7 mol % was used. The result is given in Table 1.

PREPARATION EXAMPLE 4

The procedure in Preparation Example 2 was repeated to determine the modification rate except that syndiotactic polystyrene was used in place of the styrene/p-methylstyrene copolymer having syndiotactic configuration. The result is given in Table 1.

PREPARATION EXAMPLE 5

The procedure in Preparation Example 2 was repeated to determine the modification rate except that polyphenylene ether was used in place of the styrene/p-methylstyrene copolymer having syndiotactic configuration. The result is given in Table 1.

EXAMPLE 1

To 95 parts by weight of syndiotactic polystyrene (SPS, weight-average molecular weight of 348,000, weight-average molecular weight Mw/number-average molecular weight Mn of 2.64) were added, 5 parts by weight of maleic anhydride-modified styrenic polymer as obtained in Preparation Example 1, 1 part by weight of p-(tert-butyl) aluminum benzoate (produced by Dainippon Ink & Chemicals, Inc. under the tradename "PTBBA-Al") as the nucleating agent; 0.1 part by weight of (2,6-di-tert-butyl-4-methylphenyl) pentaerythritol diphosphite (produced by Adeka Argus Co., Ltd. under the tradename "PEP-36") as an antioxidant and 0.1 part by weight of tetrakis[methylene-3-(3',5'-di-tert-butyl-4'-hydroxyphenyl)] propionate (produced by Adeka Argus Co., Ltd. under the tradename "MARK AO60") also as an antioxidant, and the resultant mixture was blended with a Henschel mixer. Subsequently the blend was incorporated with 43 parts by weight of aminosilane-treated glass fiber (03T-488, 13 μm/3 mm, produced by Japan Electric Glass Co., Ltd.) as the inorganic filler by side feeding and pelletized with a twin-screw extruder. The pellet thus obtained was injection molded to produce test pieces for Izod impact test, flexural test and tensile test, respectively. Measurements were made of Izod impact strength, heat distortion temperature and tensile strength before and after long-term heat resistance test of the test pieces thus obtained. The results are given in Table 2.

EXAMPLES 2–5 AND COMPARATIVE EXAMPLES 1 TO 5

The procedure in Example 1 was repeated except that the kinds and amounts of the maleic anhydride-modified styrenic polymer or maleic anhydride-modified polyphenylene ether were altered as given in Table 2. The result are given in Table 2.

EXAMPLE 6

To 85 parts by weight of syndiotactic polystyrene (SPS, weight-average molecular weight of 348,000, weight-average molecular weight Mw/number-average molecular weight Mn of 2.64) were added, 5 parts by weight of maleic anhydride-modified styrenic polymer as obtained in Preparation Example 1, 10 parts by weight of SEBS (Kraton G-1651, produced by Shell Chem. Co), 1 part by weight of p-(tert-butyl) aluminum benzoate (produced by Dainippon Ink & Chemicals, Inc. under the tradename "PTBBA-Al") as the nucleating agent; 0.1 part by weight of (2,6-di-tert-butyl-4-methylphenyl) pentaerythritol diphosphite (produced by Adeka Argus Co., Ltd. under the tradename "PEP-36") as an antioxidant and 0.1 part by weight of tetrakis [methylene-3-(3',5'-di-tert-butyl-4'-hydroxyphenyl)] propionate (produced by Adeka Argus Co., Ltd. under the tradename "MARK AO60") also as an antioxidant, and the resultant mixture was blended with a Henschel mixer. Subsequently the blend was incorporated with 43 parts by weight of aminosilane-treated glass fiber (03T-488, 13 μm/3 mm produced by Japan Electric Glass Co., Ltd.) as the inorganic filler by side feeding and pelletized with a twin-screw extruder. The pellet thus obtained was injection molded to produce test pieces for Izod impact test, flexural test and tensile test, respectively. Measurements were made of Izod impact strength, heat distortion temperature and tensile strength before and after long-term heat resistance test of the test pieces thus obtained. The results are given in Table 2.

EXAMPLE 7 AND COMPARATIVE EXAMPLES 6 TO 8

The procedure in Example 6 was repeated except that the kinds and amounts of the maleic anhydride-modified styrenic polymer or maleic anhydride-modified polyphenylene ether were altered as given in Table 2. The results are given in Table 2.

EXAMPLE 8

To 25 parts by weight of syndiotactic polystyrene (SPS, weight-average molecular weight of 348,000, weight-average molecular weight Mw/number-average molecular weight Mn of 2.64) were added, 5 parts by weight of maleic anhydride-modified styrenic polymer as obtained in Preparation Example 2, 70 parts by weight of 6,6-nylon (2020B, produced by Ube Industries Ltd.), 1 part by weight of p-(tert-butyl) aluminum benzoate (produced by Dainippon Ink & Chemicals, Inc. under the tradename "PTBBA-Al") as the nucleating agent; 0.1 part by weight of (2,6-di-tert-butyl-4-methylphenyl) pentaerythritol diphosphite (produced by Adeka Argus Co., Ltd. under the tradename "PEP-36") as an antioxidant and 0.1 part by weight of tetrakis[methylene-3-(3',5'-di-tert-butyl-4'-hydroxy-phenyl)] propionate (produced by Adeka Argus Co., Ltd. under the tradename "MARK AO60") also as an antioxidant, and the resultant mixture was blended with a Henschel mixer. Subsequently the blend was pelletized with a twin-screw extruder. The pellet thus obtained was injection molded to produce test pieces for Izod impact test, flexural test and tensile test, respectively. Measurements were made of Izod impact strength, heat distortion temperature, tensile strength before and after long-term heat resistance test and water absorption properties, of the test pieces thus obtained. The results are given in Table 3.

EXAMPLES 9 TO 12 AND COMPARATIVE EXAMPLES 9 TO 15

The procedure in Example 8 was repeated except that the kinds and amounts of the maleic anhydride-modified styrenic polymer or maleic anhydride-modified polyphenylene ether and the compounding proportions of the components (A) and (C) were altered as given in Table 3. The results are given in Table 3.

The above-described tests were conducted under the following conditions.

Izod impact test with notch: according to JIS K-7110

Heat distortion temperature test: according to JIS K-7207 (18.5 kg/cm$^2$)

Tensile strength test: according to JIS K-7113

Water absorption properties test: according to JIS K-7209

TABLE 1

| | Polymer used for modification | Amount of maleic anhidride added, phr* | Radical generating agent kind | amount added, phr* | Modification rate |
|---|---|---|---|---|---|
| Preparation Example 1 | syndiotactic styrene/ p-methylstyrene copolymer, p-methylstyrene content of 12 mol % | 3 | — | — | 0.51 |
| Preparation Example 2 | syndiotactic styrene/ p-methylstyrene copolymer, p-methylstyrene content of 12 mol % | 3 | 2,3-dimethyl-2,3-diphenylbutane | 1.0 | 1.05 |
| Preparation Example 3 | syndiotactic styrene/ p-methylstyrene copolymer, p-methylstyrene content of 7 mol % | 3 | 2,3-dimethyl-2,3-diphenylbutane | 1.0 | 0.70 |
| Preparation Example 4 | syndiotactic polystyrene | 3 | 2,3-dimethyl-2,3-diphenylbutane | 1.0 | trace |
| Preparation Example 5 | polyphenylene ether | 3 | 2,3-dimethyl-2,3-diphenylbutane | 1.0 | 1.35 |

*phr: part/s by weight per 100 parts of resin

TABLE 2

| | Amount of syndiotactic polystyrene added, wt % | Modified polymer kind | Amount of polymer added, wt % | Amount of glass fiber added, phr | Amount of rubbery elastomer added, wt % | Izod impact strength with notch, KJ/m² | Heat distortion temperature at 18.5 kgf, °C. | Tensile strength MPa initial stage | 150° C., 1500 hr |
|---|---|---|---|---|---|---|---|---|---|
| Example 1 | 95 | Preparation Example 1 | 5 | 43 | — | 7.3 | 255 | 103 | 94 |
| Example 2 | 95 | Preparation Example 2 | 5 | 43 | — | 8.2 | 257 | 111 | 96 |
| Example 3 | 90 | Preparation Example 2 | 10 | 43 | — | 9.5 | 258 | 115 | 98 |
| Example 4 | 70 | Preparation Example 3 | 30 | 43 | — | 10.3 | 255 | 115 | 93 |
| Example 5 | — | Preparation Example 3 | 100 | 43 | — | 10.5 | 248 | 120 | 99 |
| Example 6 | 85 | Preparation Example 2 | 5 | 43 | 10 | 11.3 | 252 | 109 | 95 |
| Example 7 | 80 | Preparation Example 2 | 10 | 43 | 10 | 12.0 | 254 | 110 | 98 |
| Compartive Example 1 | 100 | — | — | 43 | — | 4.2 | 227 | 78 | 50 |
| Compartive Example 2 | 70 | Preparation Example 4 | 30 | 43 | — | 4.5 | 229 | 88 | 75 |
| Compartive Example 3 | — | Preparation Example 4 | 100 | 43 | — | 5.3 | 231 | 90 | 79 |
| Compartive Example 4 | 97 | Preparation Example 5 | 3 | 43 | — | 10.0 | 257 | 110 | 61 |
| Comparative Example 5 | 95 | Preparation Example 5 | 5 | 43 | — | 10.8 | 242 | 121 | 59 |
| Compartive Example 6 | 90 | — | — | 43 | 10 | 4.7 | 210 | 65 | 51 |
| Compartive Example 7 | 80 | Preparation Example 4 | 10 | 43 | 10 | 4.6 | 215 | 70 | 52 |
| Compartive Example 8 | 57 | Preparation Example 5 | 3 | 43 | 10 | 12.5 | 250 | 110 | 72 |

TABLE 3

| | Amount of syndiotactic polystyrene added, wt % | Modified polymer kind | Amount of polymer added, wt % | Amount of other thermoplastic resin added, wt % | Izod Impact strength with notch, KJ/m² | Water absorption properties 23° C., 24hr, % | Heat distortion temperature at 18.5 kgf, °C. | Tensile strength MPa initial stage | 150° C. 1500 hr |
|---|---|---|---|---|---|---|---|---|---|
| Example 8 | 25 | Preparation Example 2 | 5 | 70 | 2.0 | 2.0 | 93 | 81 | 77 |
| Example 9 | 45 | Preparation Example 2 | 5 | 50 | 1.2 | 1.5 | 138 | 83 | 80 |
| Example 10 | 40 | Preparation Example 2 | 10 1.0 | 50 122 | 1.5 68 | 1.3 61 | 141 | 88 | 85 |
| Example 11 | 65 | Preparation Example 2 | 5 | 30 | 1.0 | 1.0 | 122 | 68 | 61 |
| Example 12 | 0 | Preparation Example 2 | 50 | 50 | 2.3 | 1.0 | 145 | 99 | 92 |
| Comparative Example 9 | 0 | — | — | 100 | 3.5 | 4.5 | 70 | 103 | 97 |
| Comparative Example 10 | 30 | — | — | 70 | 1.3 | 3.2 | 91 | 65 | 58 |
| Comparative Example 11 | 50 | — | — | 50 | 0.9 | 2.2 | 140 | 52 | 49 |
| Comparative Example 12 | 70 | — | — | 30 | 0.7 | 1.3 | 120 | 45 | 42 |
| Comparative Example 13 | 40 | Preparation Example 4 | 10 | 50 | 1.0 | 2.0 | 142 | 76 | 65 |
| Comparative Example 14 | 45 | Preparation Example 5 | 5 | 50 | 1.2 | 1.8 | 14i | 83 | 60 |
| Comparative Example 15 | 40 | Preparation Example 5 | 10 | 50 | 1.4 | 1.6 | 123 | 98 | 62 |

The effect on improving the adhesion of the polymer to the inorganic filler can be seen from Table 2, where the dynamical properties and heat distortion temperature of the present composition are markedly improved by the use of the modified styrenic polymer in whole or in part in the component (A) (Examples 1 to 7) as compared with Comparative Example 1 or 6 wherein the modified styrenic polymer is not used and Comparative Examples 2,3 and 7 wherein the syndiotactic polystyrene which has been modified under the same conditions is used in place of the modified styrenic polymer in Examples 1 to 7. Even a large amount of the modified styrenic polymer added in the present composition exhibits long-term thermal stability without lowering heat distortion temperature as compared with Comparative Examples 4,5 and 8 wherein the maleic anhydride-modified polyphenylene ether is used in place of the modified styrenic polymer.

On the other hand, the effect on improving the compatibility with other type of resin can be seen from Table 3, where the dynamical properties and water absorption properties are markedly improved by the use of the modified styrenic polymer in whole or in part in the component (A) (Examples 8 to 12) as compared with Comparative Examples 9 to 12 wherein the modified styrenic polymer is not used and Comparative Example 13 wherein the syndiotactic polystyrene which has been modified under the same conditions is used.

Likewise, even a large amount of the modified styrenic polymer added in the present composition exhibits long-term thermal stability without lowering heat distortion temperature as compared with Comparative Examples 14 and 15 wherein the maleic anhydride-modified polyphenylene ether is used.

What is claimed is:

1. A thermoplastic resin composition which comprises as principal components 100 parts by weight of (A) a styrenic resin comprising (a) a modified styrenic polymer or (b) the mixture of said modified styrenic polymer and a styrenic polymer having syndiotactic configuration; and 1 to 350 parts by weight of (B) an inorganic fibrous filler,
wherein said styrenic polymer having syndiotactic configuration comprising at least one substituted styrene unit substituted with an alkyl substituent on the phenyl group,
said modified styrenic polymer is a styrenic polymer having syndiotactic configuration modified with a compound having at least one unsaturated group and at least one polar group, and
said compound having at least one unsaturated group and at least one polar group is selected from the group consisting of unsaturated carboxylic acids, unsaturated carboxylic acid esters, unsaturated carboxylic acid amides, unsaturated carboxylic acid anhydrides, unsaturated carboxylic acid salts, unsaturated carboxylic acid imides, unsaturated carboxylic acid azides, halogenated unsaturated carboxylic acids and unsaturated epoxy compounds.

2. The composition according to claim 1 wherein the compound having at least one unsaturated group and at least one polar group is selected from the group consisting of unsaturated carboxylic acid, unsaturated epoxy compounds and unsaturated carboxylic acid anhydride.

3. The composition according to claim 1 wherein the (B) inorganic filler is surface-treated with a coupling agent.

4. The composition according to claim 1, wherein said inorganic filler is a fibrous filler selected from the group consisting of glass fiber, carbon fiber, whisker, ceramic fiber and metallic fiber.

5. The composition according to claim 4, wherein said fibrous filler is selected from the group consisting of boron, alumina, silica, silicon carbide, gypsum, potassium titanate, magnesium sulfate, magnesium oxide, copper, aluminum and steel.

6. The composition according to claim 1 wherein the styrenic polymer having syndiotactic configuration is a copolymer of styrene and a substituted styrene with an alkyl substituent on the phenyl group, said copolymer having syndiotactic configuration.

7. The composition of claim 1, wherein said at least one substituted styrene unit is selected from the group consisting of methyl styrene, ethyl styrene, isopropyl styrene, tert-butyl styrene, vinyl styrene and chloromethyl styrene.

8. The composition of claim 1, wherein said at least one substituted styrene unit is selected from the group consisting of p-methyl styrene, m-methyl styrene and p-tert-butyl styrene.

9. The composition of claim 1, wherein said at least one substituted styrene unit is a methyl styrene, said inorganic filler is glass fiber, and said compound having at least one unsaturated group and one polar group is selected from the group consisting of maleic anhydride, fumaric acid and glycidyl methacrylate.

10. A thermoplastic resin composition which comprises as principal components 5 to 95% by weight of (A) a styrenic resin comprising (a) a modified styrenic polymer in which a styrenic polymer having syndiotactic configuration is combined with a compound having at least one unsaturated group and at least one polar group or (b) the mixture of said modified styrenic polymer and a styrenic polymer having syndiotactic configuration; and 95 to 5% by weight of (C) a thermoplastic resin other than said styrenic resin (A), said styrenic polymer having syndiotactic configuration comprising at least one substituted styrene unit substituted with alkyl substituent on the phenyl group.

11. The composition according to claim 10 wherein the compound having at least one unsaturated group and at least one polar group is selected from the group consisting of unsaturated carboxylic acid, unsaturated carboxylic acid esters, unsaturated carboxylic acid amides, unsaturated carboxylic acid anhydrides, unsaturated carboxylic acid salts, unsaturated carboxylic acid imides, unsaturated carboxylic acid azides, halogenated unsaturated carboxylic acids, unsaturated epoxy compound, unsaturated alcohol, unsaturated amine and unsaturated isocyanic acid ester.

12. The composition according to claim 10 wherein the (C) thermoplastic resin other than said styrenic resin (A) is selected from the group consisting of modified polyolefin, olefin/polar vinyl monomer copolymer, polyamide, polycarbonate, polyaryl ester (polyarylate), polyethylene terephthalate, polybutylene terephthalate and modified polyphenylene sulfide.

13. The composition according to claim 10 wherein the styrenic polymer having syndiotactic configuration is a copolymer of styrene and a substituted styrene with an alkyl substituent on the phenyl group, said copolymer having syndiotactic configuration.

14. A thermoplastic resin composition comprising:
(A) 100 parts by weight of
    (a) a styrenic polymer having syndiotactic configuration modified with a modifying compound, or
    (b) a mixture of a styrenic polymer having syndiotactic configuration, and a styrenic polymer having syndiotactic configuration modified with a modifying compound, and
(B) 1–350 parts by weight of an inorganic fibrous filler,
wherein said styrenic polymer having syndiotactic configuration comprises at least one substituted styrene unit substituted with an alkyl substituent on the phenyl group, and
said modifying compound is selected from the group consisting of unsaturated carboxylic acids, unsaturated carboxylic acid anhydrides and vinyl compounds having an epoxide group.

15. The thermoplastic resin composition of claim 14, wherein said substituted styrene unit is p-alkylstyrene.

16. The thermoplastic resin composition of claim 14, wherein said substituent styrene unit is p-methylstyrene.

* * * * *